United States Patent [19]

Delagi et al.

[11] 4,156,882
[45] May 29, 1979

[54] MAGNETIC TRANSDUCER

[75] Inventors: Richard G. Delagi, Sharon, Mass.; George Trenkler, East Providence, R.I.

[73] Assignee: Texas Instruments Incorporated, Dallas, Tex.

[21] Appl. No.: 861,065

[22] Filed: Dec. 15, 1977

[51] Int. Cl.² ............................................. G11B 5/16
[52] U.S. Cl. .................................................. 360/126
[58] Field of Search ....................... 360/126, 122, 129

[56] References Cited

U.S. PATENT DOCUMENTS

| | | | |
|---|---|---|---|
| 3,610,839 | 10/1971 | Sand | 360/129 |
| 3,673,353 | 6/1972 | Tiemann et al. | 360/126 |
| 3,683,126 | 8/1972 | Krause | 360/126 |
| 3,867,368 | 2/1975 | Lazzari | 360/126 |

Primary Examiner—Robert S. Tupper
Attorney, Agent, or Firm—John A. Haug; James P. McAndrews

[57] ABSTRACT

A magnetic transducer head has a plurality of magnetic laminations secured together in stacked relation to each other to form a magnetic core having a pair of pole faces disposed in spaced, facing relation to each other with a small gap therebetween and to define other surfaces of the core adjacent to the gap which are adapted for sliding engagement with the magnetic surface of a recording tape. Electrical coil means are inductively coupled to the core. Alternate magnetic laminations of the core incorporate materials of different magnetic and physical characteristics so that the laminations cooperate in determining the characteristics of the core. The materials of some laminations preferably display a relatively high maximum induction while other laminations incorporate materials having a relatively high initial permeability, thereby to facilitate use of the transducer both in recording and reproduction. Preferably the materials of some of the laminations have a relatively greater physical hardness than the materials of the other laminations to improve the wear characteristics of the core surfaces which are disposed in sliding engagement with the recording tape.

5 Claims, 7 Drawing Figures

MAGNETIC TRANSDUCER

Magnetic transducers used in audio and video tape recording and the like commonly employ a magnetic core formed by arranging laminations of a magnetically permeable material in stacked relation to each other. The laminations define a core which has a pair of pole faces disposed in spaced, facing relation to each other with a very small gap therebetween. The core also has other core surfaces adjacent to the gap adapted for sliding engagement with the magnetically coated surface of a recording tape. Electrical coils are positioned around legs of the core to be inductively coupled to the core. With electrical input to the coils, flux in the magnetic circuit formed by the core fringes at the core gap to penetrate the magnetic coating of a recording tape which is moved in sliding engagement with the core across the core gap, thereby to record information on the tape in the form of a pattern of magnetization in the tape coating. Conversely, when a tape having information magnetically recorded thereon is moved in sliding engagement with the core across the core gap, an electrical output is induced in the coils for reproducing the information from the tape. The width of the core gap is selected to achieve desired flux fringing at the core gap for penetrating the tape during recording while also assuring a desired frequency response during reproduction of information from the tape. The core is formed of laminations, which have electrically insulating coatings thereon, to reduce eddy currents in the core. The magnetically permeable material in the laminations is normally in a physcially soft, annealed condition to assure the magnetic softness of the material.

When such conventional transducers are used, the sliding engagement of the recording tape with the core tends to wear away the core surfaces adjacent to the core gap, ultimately reducing the gap depth to an excessive degree or causing smearing of the annealed core metal across the gap. Such smearing can occur even when a non-magnetic filler material is disposed within the gap. Accordingly, the wearing or smearing of the core material significantly limits the service life of the transducers. This is particularly true where newer tape materials having more abrasive magnetic coatings are used. In addition, such newer tape materials have relatively higher maximum induction properties than previously known tapes and are adapted to display significantly improved magnetic recording capabilities. However, in using conventional transducers for recording on the new tapes it has been difficult to achieve adequate flux fringing at the core gap to assure sufficient penetration of the tapes to permit full utilization of the information-recording capabilities of the new tapes. This is particularly true where the conventional transducer used in recording is also intended to be used in reproducing information from the tapes.

It is an object of this invention to provide a novel and improved magnetic transducer; to provide such an improved transducer which has an improved service life; to provide such an improved transducer which is particularly adapted to display an improved service life when used with newer, more abrasive recording tape materials; and to provide such an improved transducer which is adapted to more fully utilize the information recording capabilities of new tape recording materials while also being adapted to adequately reproduce information from the tapes.

Briefly described, the novel and improved magnetic transducer of this invention comprises a magnetic core having a plurality of magnetic laminations secured together in stacked, side-by-side, parallel, electrically insulated relation to each other to define a core having a pair of pole faces disposed in facing relation to each other with a narrow gap therebetween and to define other core surfaces adjacent the gap which are adapted for sliding engagement with the magnetically coated surface of a record medium. Electrical conductor means are inductively coupled to the core. In the transducer of this invention, the laminations of the core each incorporate magnetically permeable materials. However, selected ones of the laminations embody materials having selected magnetic and physical characteristics while other laminations alternately interleaved with the first-named laminations are formed of materials having different magnetic and physical characteristics, the laminations then cooperating in determining the characteristics of the core.

In one embodiment of the invention, for example, alternate laminations of the core are formed of a conventional nickel-iron alloy such as permalloy which is in annealed condition for assuring a desired magnetic softness of the material. These selected laminations have a selected thickness and have electrically insulating coatings thereon for achieving a desired reduction in eddy currents in the core. The other laminations of the core are relatively much thinner and incorporate a magnetically permeable material which has a significantly greater hardness than permalloy. Typically for example, such thinner laminations incorporate a cobalt-iron alloy such as permendur which, even after heat treating for achieving a desired magnetic softness, has a substantially greater physical hardness than permalloy. In this construction, selected magnetic characteristics of the core are primarily determined by the thicker laminations of the core whereas the other laminations, while contributing to the magnetic properties of the core, also serve as supporting ribs for very substantially reducing wearing of the core surfaces which are slidingly engaged by a record medium during use of the transducer.

In another preferred embodiment of this invention, in which the core laminations are typically of equal or nearly equal thickness, alternate laminations of the core are formed of a cobalt-iron alloy of the like which has a relatively low initial magnetic permeability but which has a very high maximum magnetic induction characteristic. The other core laminations are formed of an aluminum-silicon-iron alloy or the like which, although commonly displaying relatively lower maximum magnetic induction, is characterized by relatively much greater initial magnetic permeability. Typically the aluminum-silicon-iron alloy has substantially greater physical hardness than the noted cobalt-iron. In this construction, the core laminations cooperate in achieving very substantially improved flux fringing at the core gap to permit much better use of the information recording capabilities of the previously noted new tape materials. In addition the high initial magnetic permeability characteristic of selected core laminations assures that the transducer is also adapted to achieve satisfactory reproduction of the information recorded on the new tapes. In addition, where some of the laminations have relatively greater physical hardness as noted, those harder laminations contribute significantly to reducing wearing of the core surfaces which are in sliding engagement with the recording tapes.

Of course, various combinations of core lamination materials other than those specifically described above are possible within the scope of this invention whereby the different magnetically permeable materials used in the laminations cooperate in determining the magnetic and other characteristics of the core.

Other objects, advantages and details of this invention appear in the following detailed description of preferred embodiments of the invention, the detailed description referring to the drawings in which.

Figure 1:
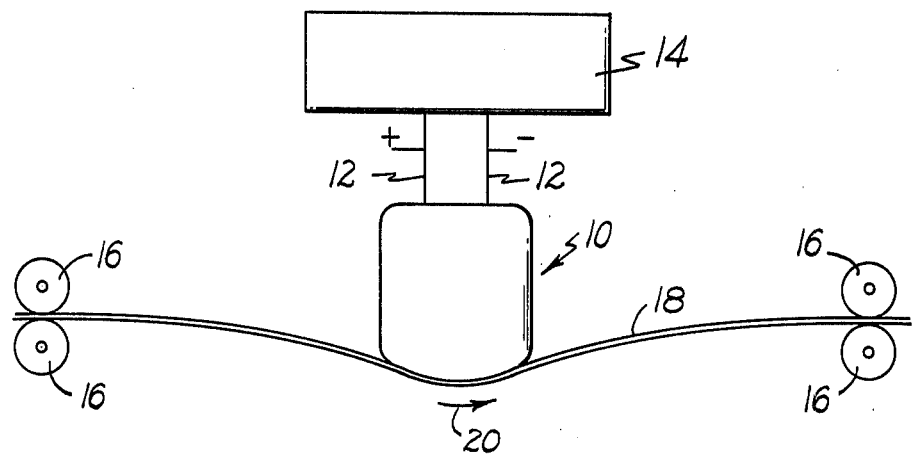
FIG. 1 is a schematic view illustrating use of the transducer of this invention.

Referring to the drawings, 10 in FIG. 1 schematically illustrates the novel and improved magnetic transducer head of this invention which is shown with the leads 12 extending from the head connected into an otherwise conventional magnetic recording-reproducing system 14 and with a tape transport system represented by the feed rolls 16 arranged to move a magnetic recording tape 18 in sliding engagement with the transducer as indicated by the arrow 20.

Figure 2:
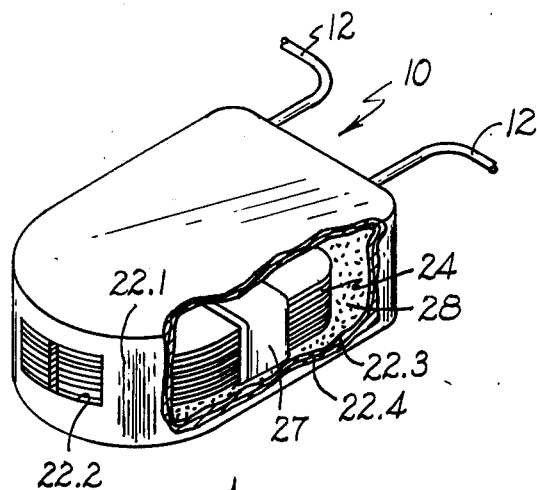
FIG. 2 is a perspective view of the transducer partially cut away to illustrate internal components thereof.

As shown in FIG. 2, the transducer head 10 typically includes a housing 22 which has a contoured surface 22.1 with a window 22.2 therein adapted to permit sliding movement of the tape 18 over the head. A magnetic core unit 24 forming a magnetic flux circuit and having coil means 27 mounted thereon and inductively coupled to the core is positioned within the housing and is secured therein by means of an electrically insulating and non-magnetic cement or potting compound 28 of any conventional type, whereby a portion of the magnetic core unit is disposed in the housing window spaced from the surrounding housing to be slidably engaged by the magnetic tape 18.

Figure 3:
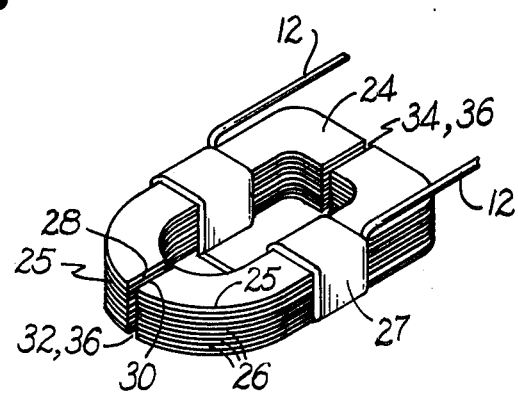
FIG. 3 is a perspective view of magnetic core and coil means used in the device of FIG. 2.

As shown in FIG. 3, the magnetic core unit 24 is formed of a plurality of magnetic laminations 26 each of which incorporates a magnetically permeable material and each of which has an electrically insulating coating thereon. The laminations 26 are arranged in stacked, side-by-side, parallel, electrically insulated relation to each other as shown in FIG. 3 so that the core unit 24 as defined by the laminations has a pair of magnetic pole faces 28 and 30 which are disposed in spaced, facing relation to each other with a very small gap 32 therebetween. The core unit as defined by the laminations is also provided with surfaces 25 adjacent to the gap 32 on either side of the gap, the surfaces 25 being appropriately contoured as shown in FIG. 3 to be accommodated in the housing window 22.2 to be slidably engaged with the magnetic tape 18. Typically, to facilitate manufacture of the core, each of the core laminations 26 is made up of a pair of generally C-shaped lamination sections and, when such C-shaped sections are used, the core unit also has a rear gap 34 therein as shown in FIG. 3. Where desired a gap filler means 36 of non-magnetic material is disposed within the core gaps in conventional manner to facilitate forming of the gaps with the desired widths and to reduce the risk of smearing of core metal across the gap. Conventional electrical coil means 27 are wound on legs of the core unit, or are otherwise positioned on the core legs, to be inductively coupled to the core. The coil means are electrically insulated from the core unit in any conventional manner and any conventional means are used for securing the core laminations in the described assembly.

Figure 4:
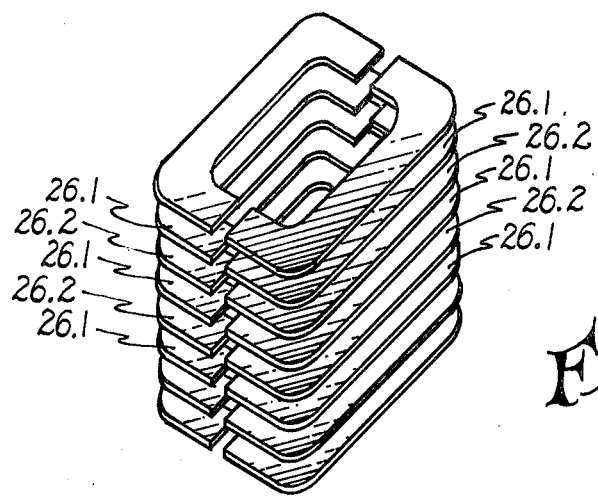
FIG. 4 is an exploded view of the core shown in FIG. 3.

The magnetic transducer 10 as thus far described is of conventional construction. In accordance with this invention, however, alternate ones 26.1 of the magnetic core laminations as shown in FIG. 4 are formed of a magnetically permeable material having selected magnetic and physical characteristics while the other core laminations 26.2 incorporate a magnetically permeable material having different magnetic and/or physical characteristics, whereby the laminations 26.1 and 26.2 cooperate in determining the characteristics of the core unit 24.

As will be understood, the materials of the selected laminations are chosen to provide the core unit with a desired combination of magnetic characteristics. In this regard, it will be understood that the characteristics of various conventional magnetic materials are adapted to be modified by the incorporation of various contaminants or fillers in the magnetic material, or by the introduction of controlled porosity in laminations formed from a selected material to have the effect of a distributed gap in the circuit formed by the laminations, so that the different laminations cooperate to form a core unit having desired magnetic properties. For example, where one or more of the core laminations is made by powder metallurgy techniques, controlled porosity is easily introduced into the laminations so that the hysteresis curve of the resulting core unit is substantially smooth or straight between knees of the curve even though the widths of the hysteresis loops of the materials of the laminations combined in the core unit are significantly different.

Figure 5:
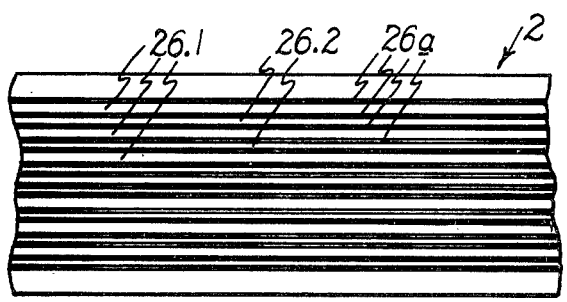
FIG. 5 is a section view to enlarged scale along line 5—5 of FIG. 3.

In a preferred embodiment of this invention as shown in FIG. 5, selected laminations 26.1 incorporate a nickel-iron alloy such as permalloy embodying 50 percent nickel and the balance iron, by weight. The other laminations 26.2 of the core incorporate a cobalt-iron alloy such as permendur embodying 50 percent cobalt and the balance iron, by weight. The nickel-iron laminations 26.1 have a thickness on the order of three times greater than the thickness of the cobalt-iron laminations 26.2 so that the lamination 26.1 primarily determine selected magnetic characteristics of the core unit 24. Each of the laminations has a relatively very thin electrically insulating coating 26a formed of any lamination insulating material conventionally used in such magnetic cores for reducing eddy currents in the core. In this construction, the nickel-iron lamination materials 26.1 have a maximum magnetic induction on the order to 6500 gauss and have a physical hardness in the order of B-58 to B-60 on the Rockwell Hardness Scale (American Society For Testing Materials-Test E18-42) when in annealed condition for optimizing the magnetic properties including the magnetic softness of the material. The cobalt-iron lamination materials 26.2 have a relatively greater maximum magnetic induction on the order of 23000 gauss and have a physical hardness on the order of C-25 to C-35 on the Rockwell Hardness Scale when in annealed condition for optimizing the magnetic properties including the magnetic softness of the material. Accordingly the transducer 10 is adapted for use, particularly with magnetic recording tapes using conventional magnetic surface coatings of ferrous oxide ($\lambda FE_xO_3$) or chromium oxide ($CrO_2$) which have maximum magnetic induction characteristics on the order of 1500 and 1400 gauss respectively, in various conventional magnetic recording-reproducing systems where conventional transducers using permalloy magnetic core laminations have previously been used. However, the hardness of the cobalt-iron laminations of the core circuit of this transducer of this invention provides the core surfaces 25 with substantially improved wear characteristics for substantially improving the service life of the transducer 10.

Figure 6:
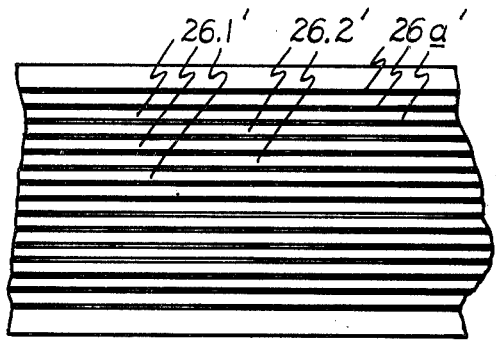
FIG. 6 is a view similar to FIG. 5 illustrating an alternate embodiment of the invention.

In another preferred embodiment of this invention as shown in FIG. 6, each of the laminations 26.1' incorporates a cobalt-iron alloy such as the permendur alloy noted above. The other laminations 26.2' of the core incorporate an aluminum-silicon-iron alloy such as Alfesil embodying 6 percent aluminum, 8 percent silicon, and the balance iron, by weight. The laminations 26.1' and 26.2' have substantially equal thickness and have electrically insulating coatings thereon. In this construction, the cobalt-iron lamination materials have a maximum magnetic induction of about 23000 gauss and a physical hardness of from C-25 to C35 in the Rockwell Hardness Scale, but have a relatively low initial magnetic permeability. The laminations of the aluminum-silicon-iron alloy have a maximum magnetic induction of about 9000 gauss and a physical hardness on the order of C-42 on the Rockwell hardness but have a relatively much higher initial magnetic permeability. Accordingly, the transducer 10' shown in FIG. 6 is particularly adapted for use with newer magnetic recording tapes using magnetic surface coatings of permalloy materials or the like which may have maximum magnetic induction characteristics greater than 6000 gauss. That is, the magnetic circuit formed by the core 24' shown in FIG. 6 has an effective maximum magnetic saturation level on the order of 16000 gauss and is adapted to provide adequate flux fringing at the core gap 32' to assure proper penetration of the magnetic coating of the newer tape for achieving full utilization of the information recording capabilities of the newer tapes. On the other hand, the relatively high initial magnetic permeability of the laminations 26.2' assures that the transducer 10' is also adapted for use in reproducing recorded information from the new tape materials. In addition, the relatively greater physical hardness of the materials in the laminations 26.2' assures that the core surfaces 25' have the substantially improved wear characteristics adapting the transducer for use over a substantial service life with the more abrasive magnetic coatings on the new tapes.

Figure 7:
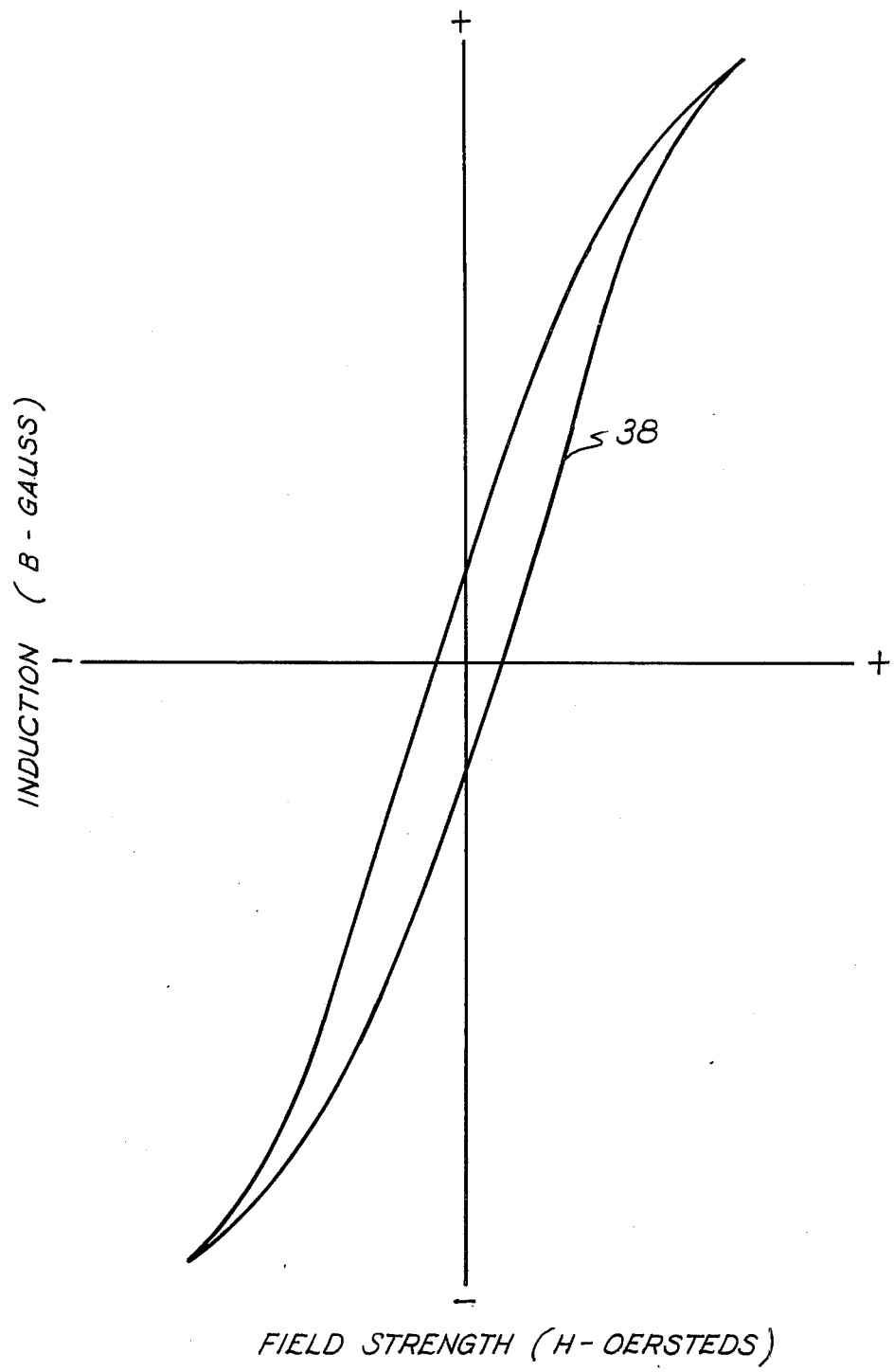
FIG. 7 is a graph illustrating characteristics of the transducer of this invention.

In one embodiment of this invention, for example, the core is formed of laminations of permendur as noted above to comprise 60 percent of the thickness of the core unit, the material of these permendur laminations having a characteristic wide hysteresis loop. The remaining 40 percent of the thickness of the core is formed of laminations of Alfesil as noted above, this material being formed with selected porosity by powder metallurgy techniques to display a selected narrow hysteresis loop. In this embodiment of the invention, the hysteresis curve of the resulting core unit is smooth and substantially straight between the knees of the curve as indicated by curve 38 in FIG. 7.

In another preferred embodiment of this invention, the housing 22 used to mount the above-described core and coil means is provided with selected magnetic characteristics for magnetically shielding the core means within the housing from the effects of extraneous magnetic fields while also providing excellent wear resistance of the housing to sliding engagement with the newer, more abrasive recording tapes presently being used. Preferably for example, the housing 22 as shown in FIG. 2 is formed of a clad or composite metal material having an inner layer 22.3 of metal of high magnetic permeability metallurgically bonded to an outer layer 22.4 of metal having high wear resistance. Preferably for example, the inner layer 22.3 if formed of mu-metal having a composition of 77 percent nickel, 5 percent copper, 1-5 percent chromium, and the balance iron by weight while the outer layer of the housing is formed of 304 Stainless Steel having a composition of 18 to 20 percent chromium, 0.08 percent carbon (max.), 2 percent manganese (max.), 1 percent silicon (max.), 8 to 12 percent nickel, and the balance iron. Such a housing provides adequate magnetic shielding while also resisting wear to the outer surfaces of the housing to effectively eliminate wear to the housing as a factor in limiting the service life of the transducer.

It should be understood that although specific embodiments of this invention have been described in detail for illustrating the invention, this invention also includes all modification and equivalents of the disclosed embodiment falling within the scope of the appended claims.

We claim:

1. A magnetic transducer for use with a magnetic record medium having a magnetizeable surface for retaining information in the form of a pattern of magnetization comprising magnet core means having a plurality of relatively thin laminations in stacked side-by-side parallel relation to each other defining a core having a pair of pole faces disposed in spaced facing relation to each other with a gap therebetween and defining other core surfaces adjacent to said gap for sliding engagement with said record medium, and electrical conductor means inductively coupled to said core means, characterized in that a plurality of said laminations incorporate a first material of relatively high initial magnetic permeability and are interleaved in alternate sequence with a plurality of others of said laminations incorporating a second material of relatively high maximum induction characteristics so that laminations of said first and second materials cooperate in each part of the core in determining the characteristics of said core.

2. A transducer as set forth in claim 1 wherein said first material is a nickel-iron alloy and said second material is a relatively much harder cobalt-iron alloy.

3. A transducer as set forth in claim 2 wherein said first material has a nominal composition by weight of 50 percent nickel and the balance iron and said second material has a nominal composition by weight of 50 percent cobalt and the balance iron.

4. A transducer as set forth in claim 1 wherein said first material is an aluminum-iron-silicon alloy and said second material is a cobalt-iron alloy, said first material being relatively much harder than said second material.

5. A transducer as set forth in claim 4 wherein said first material has a nominal composition by weight of 6 percent aluminum, 9 percent silicon and the balance iron and the second material has a nominal composition by weight of 50 percent cobalt and the balance iron.

* * * * *